(12) United States Patent
Krambeck et al.

(10) Patent No.: US 7,285,067 B2
(45) Date of Patent: Oct. 23, 2007

(54) ROTARY RECLINER

(75) Inventors: Dagoberto Krambeck, Troy, MI (US); Jason R Durand, Chesterfield, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 155 days.

(21) Appl. No.: 11/172,406

(22) Filed: Jun. 30, 2005

(65) Prior Publication Data

US 2007/0004550 A1 Jan. 4, 2007

(51) Int. Cl.
*F16H 3/70* (2006.01)
*B60N 2/225* (2006.01)

(52) U.S. Cl. .................... 475/162; 192/223.1; 297/362

(58) Field of Classification Search ................ 475/162, 475/178, 179; 297/362, 364, 365
See application file for complete search history.

(56) References Cited

U.S. PATENT DOCUMENTS

| | | | |
|---|---|---|---|
| 5,524,970 A * | 6/1996 | Kienke et al. .............. 297/362 |
| 6,296,311 B1 | 10/2001 | Bonk et al. | |
| 6,520,583 B1 | 2/2003 | Bonk | |
| 6,579,203 B2 * | 6/2003 | Wang et al. ................ 475/162 |
| 6,890,034 B2 | 5/2005 | Bonk | |
| 6,910,738 B2 | 6/2005 | Bonk | |
| 7,086,699 B1 * | 8/2006 | Addison et al. ............ 297/374 |
| 2004/0014545 A1 * | 1/2004 | Branov et al. ................ 475/11 |
| 2005/0110322 A1 * | 5/2005 | Cha ........................... 297/362 |

* cited by examiner

*Primary Examiner*—Richard M. Lorence
*Assistant Examiner*—Edwin A Young
(74) *Attorney, Agent, or Firm*—Harness, Dickey & Pierce, P.L.C.

(57) ABSTRACT

A rotary recliner includes an outer rotary member having a first series of gear teeth on an inner circumferential surface thereof and an inner rotary member having a second series of gear teeth on an outer surface thereof. An eccentric is mounted to the inner rotary member and biases the second gear teeth into meshed engagement with the first gear teeth at a first position along the inner circumferential surface such that a clearance is created between the first gear teeth and the second gear teeth at a position on the inner rotary member opposite from the first position. A wedge carrier includes a pair of wedges extending from a body. The wedges are joined by a bridge portion with each wedge including a ramped surface that engages and applies a radial force on the eccentric to prevent relative movement between the inner and outer rotary members.

8 Claims, 9 Drawing Sheets

ROTARY RECLINER

FIELD

The present teachings relate to recliner mechanisms, and more particularly, to a rotary recliner mechanism for use with a seat assembly.

BACKGROUND

Rotary recliner mechanisms typically include an outer rotary member having a plurality of inwardly-projecting gear teeth and an inner rotary member having a plurality of outwardly-extending gear teeth. The gear teeth of the inner rotary member move circumferentially about the gear teeth of the outer rotary member to selectively rotate the inner rotary member relative to the outer rotary member.

The inner rotary member may include one fewer tooth than the outer rotary member and have a diameter that is smaller than the diameter of the outer rotary member. The inner rotary member is mounted on an eccentric to bias the inner rotary member in one direction relative to the outer rotary member. The eccentric mounting provides gear teeth meshing on one portion of the inner rotary member and a clearance between the remaining gear teeth of the inner rotary member and the gear teeth of the outer rotary member.

In operation, a rotational force is applied to the eccentric to rotate the inner rotary member relative to the outer rotary member. Rotation of the inner rotary member causes the area of meshed engagement to move circumferentially around the outer rotary member.

The rotary recliner mechanism may be associated with a seating system such that the inner rotary member is associated with a seat back and the outer rotary member is associated with a seat bottom. Angular adjustment of the seat back relative to the seat bottom is accomplished when a force is applied to the eccentric and the inner rotary member is rotated relative to the outer rotary member.

In a seating system for a vehicle and the like, the seat back functions as a long lever arm against which various forces are applied. Rotary recliner mechanisms are generally disposed at a junction of a seat back and a seat bottom and are relatively small compared to the length of the reclining seat back. Therefore, vibration associated with operation of a vehicle and/or movement of an occupant may impose various forces upon that lever during use.

Any imperfection in the components of pivot mechanisms associated with the rotary recliner mechanism may allow the inner rotary member connected to the seat back to move a miniscule amount even when the mechanism is locked. Such play or backlash between the engaging teeth or tolerances between the mechanism components are magnified by the length of the lever arm and become increasingly noticeable at the upper end of the seat.

This magnified play in locking pivot mechanisms has been termed "chucking" and refers to any imperfections or play in the mechanism components that allow movement of the rotary member and attached seat back while the mechanism is in a locked condition.

One technique employed to reduce chucking is to form the components of the pivot mechanism with exceedingly close tolerances. Such techniques reduce play in the mechanism, and thus reduce chucking. Manufacturing to such close tolerance, however, is expensive and difficult to achieve. Further, close tolerances may bind the components of the system and prevent smooth operation.

Another technique used to reduce chucking is to provide a rotary recliner with a wedge carrier that is biased into engagement with the eccentric. A prior art rotary recliner 1 and wedge carrier 2 is shown in FIGS. 1 and 2 as having two discrete wedges 3 that each include a ramped surface 4 for engagement with an eccentric 5. The discrete wedges 3 are spaced apart and apply a radial force on the eccentric 5 under force of a biasing member 6.

In operation, once an adjustment is made, such that an inner rotary member 7 is in a desired position relative to an outer rotary member 8, a rotational force applied to the eccentric 5 is released. Upon release of the rotational force, each ramped surface 4 of the discrete wedges 3 is biased into engagement with the eccentric 5. The wedges 3 individually apply a force to the eccentric 5 to maintain tight engagement between the eccentric 5 and the wedge carrier 2 as well as tight engagement between the inner rotary member 7 and the outer rotary member 8 at the area of meshed engagement. Maintaining engagement between the eccentric 5 and the carrier 2 as well as between the inner rotary member 7 and the outer rotary member 8 reduces relative movement between the respective components and, thus, reduces chucking. An example of such a wedge carrier having discrete wedges is shown in U.S. Pat. No. 5,524,970.

Prior art wedge carriers and discrete wedges adequately reduce movement between the inner rotary member and outer rotary member. However, the prior art system is complex and often expensive to manufacture. The discrete wedges extend from a main body of the carrier and are therefore delicate and subject to fracture. As a result, the carrier of the prior art system cannot be manufactured by a process requiring a heat treatment. Therefore, the carrier of the prior art system requires a precision manufacturing process, resulting in high manufacturing and assembly costs.

SUMMARY

A rotary recliner includes an outer rotary member having a first series of gear teeth on an inner circumferential surface thereof and an inner rotary member having a second series of gear teeth on an outer surface thereof. An eccentric is mounted to the inner rotary member and biases the second gear teeth into meshed engagement with the first gear teeth at a first position along the inner circumferential surface such that a clearance is created between the first gear teeth and the second gear teeth at a position on the inner rotary member opposite from the first position. A wedge carrier includes a pair of wedges extending from a body. The wedges are joined by a bridge portion with each wedge including a ramped surface that engages and applies a radial force on the eccentric to prevent relative movement between the inner and outer rotary members.

Further areas of applicability of the present teachings will become apparent from the detailed description provided hereinafter. It should be understood that the detailed description and specific examples, while indicating the preferred embodiment of the teachings, are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

The following description is merely exemplary in nature and is in no way intended to limit the teachings, application, or uses.

With reference to the figures, a rotary recliner 10 is provided and includes a housing assembly 12 operably supporting an actuation assembly 14 and an anti-chucking assembly 16. The actuation assembly 14 provides for selective adjustment of the housing assembly 12 while the anti-chucking assembly 16 prohibits relative movement between components of the housing assembly 12 and actuation assembly 14 to reduce vibration noise (i.e., chucking).

Figure 1:
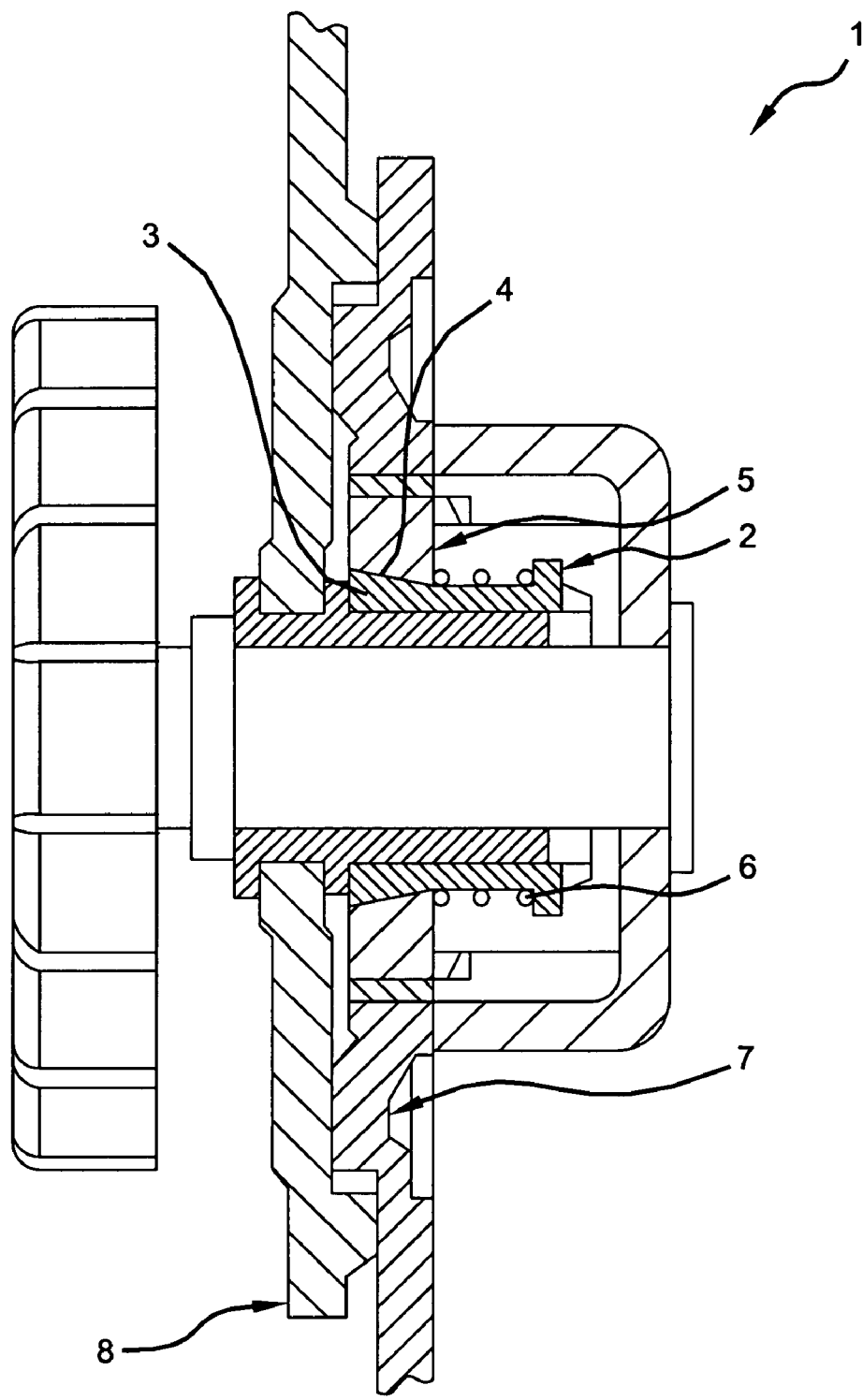
FIG. 1 is a sectional view of a prior art rotary recliner.
Figure 2:
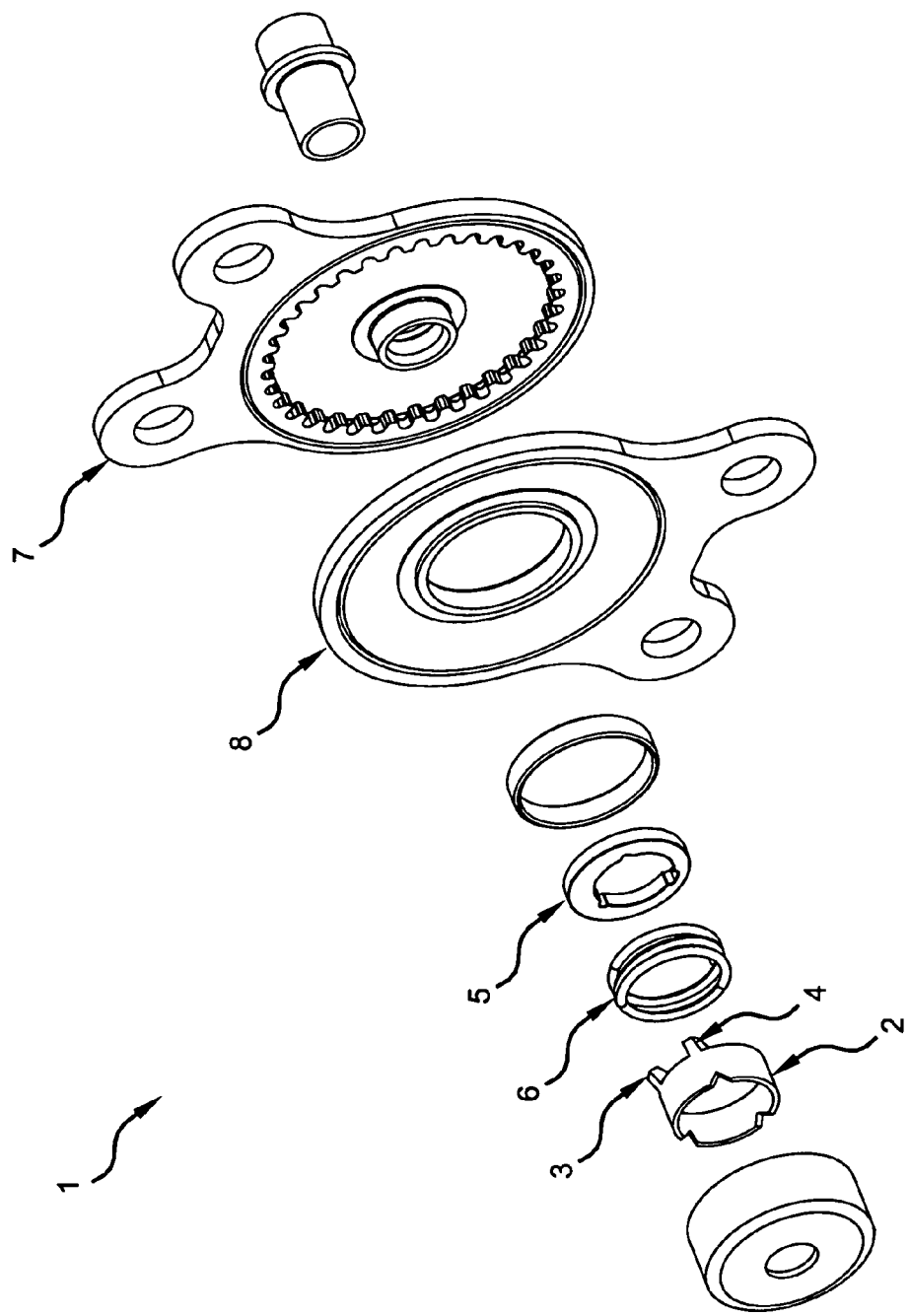
FIG. 2 is an exploded view of the prior art rotary recliner of FIG. 1.
Figure 3:
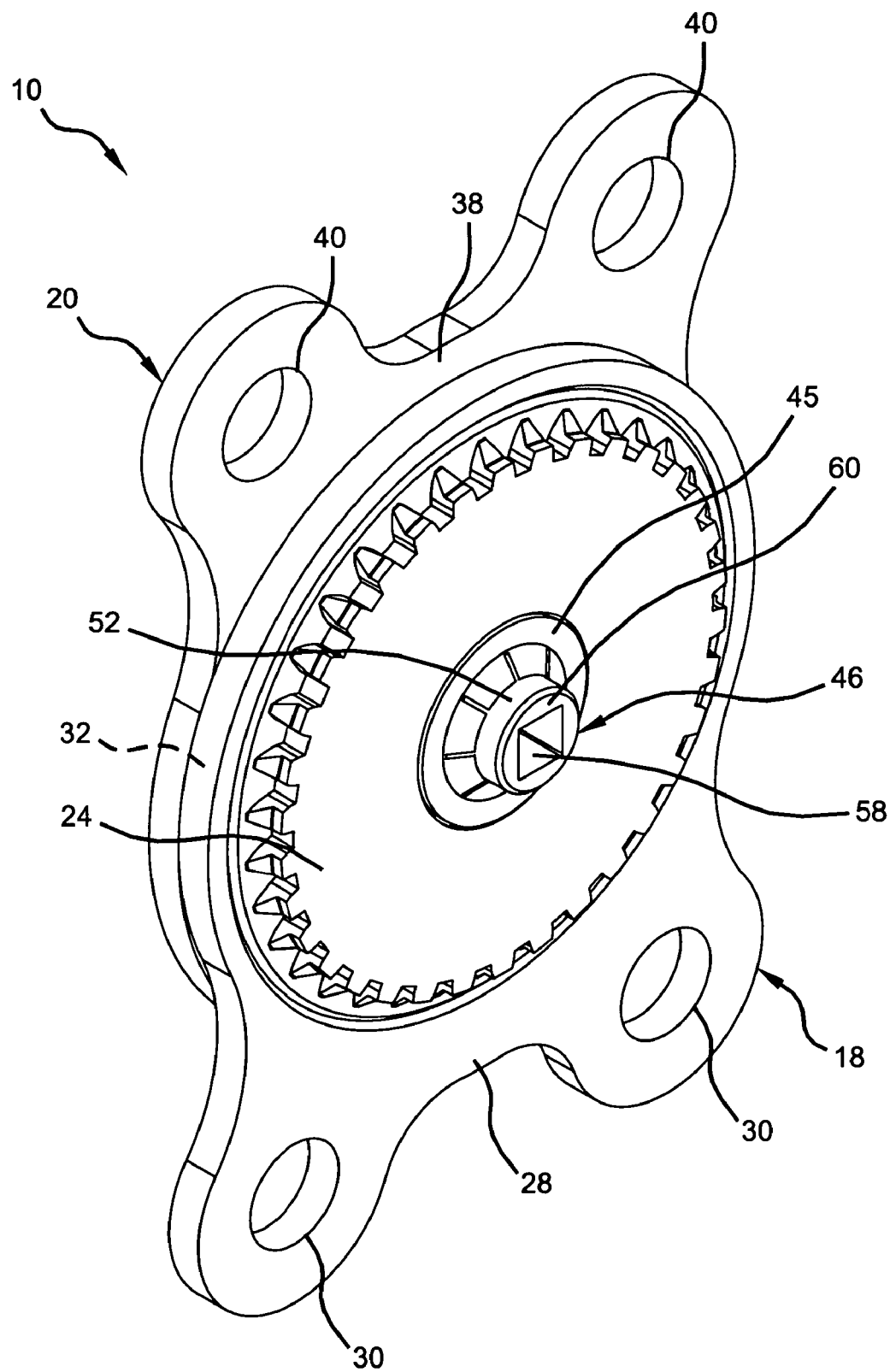
FIG. 3 is a perspective view of a rotary recliner in accordance with the principles of the present teachings.
Figure 4:
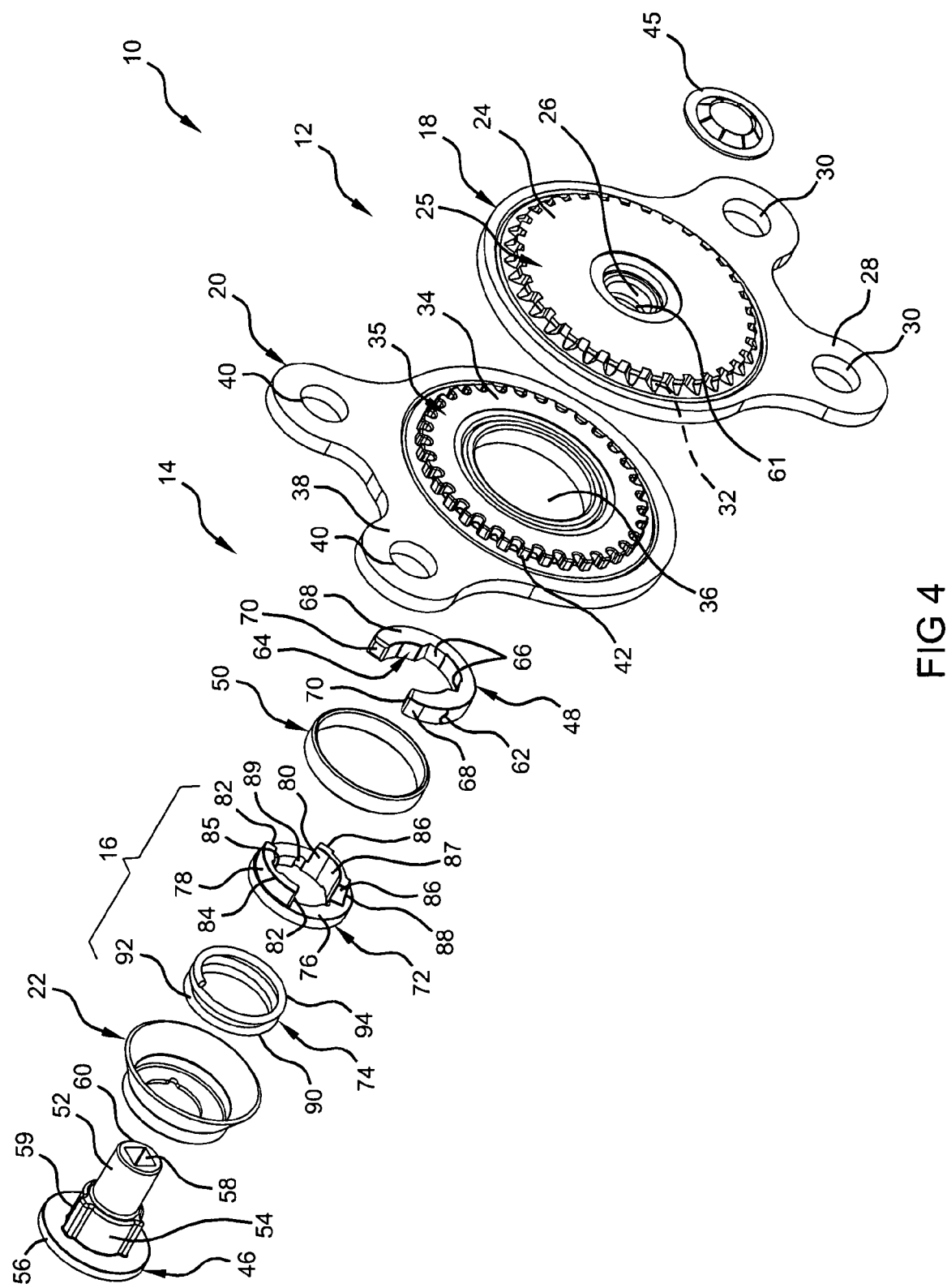
FIG. 4 is an exploded view of the rotary recliner of FIG. 3.
Figure 5:
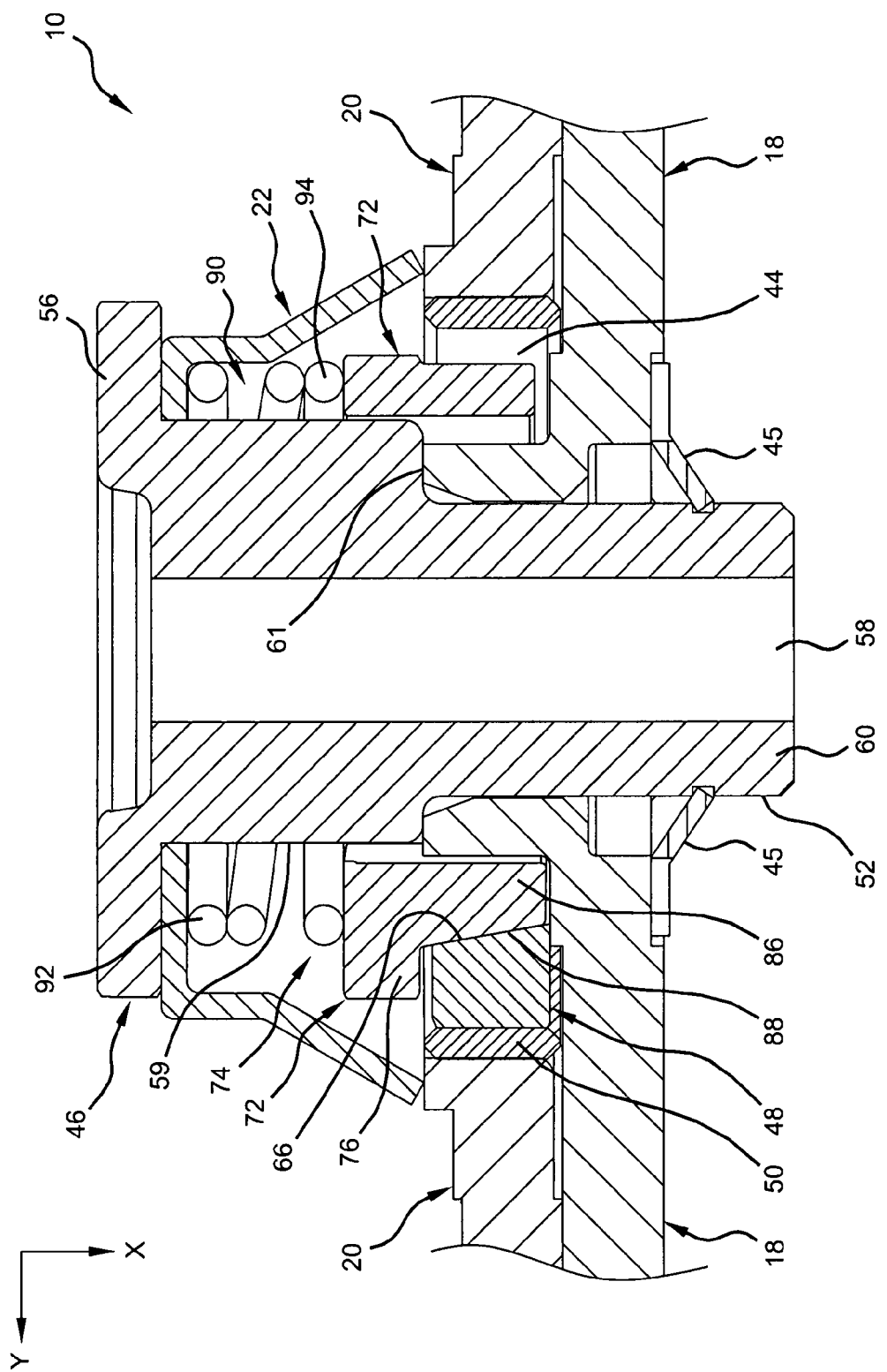
FIG. 5 is a cross-sectional view of the rotary recliner of FIG. 3.

With reference to FIGS. 3-5, the housing assembly 12 is shown to include an outer housing plate 18, an inner housing plate 20, and a cover 22. The outer housing plate 18 includes an offset portion 24 having a central aperture 26 formed therethrough and a flange 28 extending generally from the offset portion 24. The flange 28 includes a pair of attachment apertures 30 while the offset portion 24 includes a series of inwardly-extending gear teeth 32 defining an outer gear 25.

The inner housing plate 20 includes an offset portion 34 having a central aperture 36 extending therethrough and a flange 38 extending generally from the offset portion 34. The flange 38 includes a pair of attachment apertures 40 while the offset portion 34 includes a series of outwardly-extending gear teeth 42 defining an inner gear 35. The inner gear 35 of housing plate 20 includes a diameter that is smaller than the diameter of outer gear 25 such that the inner gear 35 is eccentric to the outer gear 25 when meshed.

In one example, the inner gear 35 may include one fewer tooth 42 than the outer gear 25. Removal of one gear tooth 42 from the inner gear 35 reduces the diameter of the offset 34 by at least the radial height of the teeth 42 of inner gear 35. While removal of a single gear tooth 42 is disclosed, it should be understood that the diameter of the inner gear 35 may include any number of teeth so long as the resulting diameter of the inner gear 35 is less than the diameter of the outer gear 25.

The inner gear 35 is rotatably received within the offset portion 24 of the outer housing plate 18 such that the central aperture 26 of the outer housing plate 18 is axially offset from the central aperture 36 of the inner housing plate 20. Offsetting the central aperture 26 from aperture 36 allows the teeth 42 of the inner housing plate 20 to mesh with the teeth 32 of the outer housing plate 18 and creates the eccentric relationship between the inner and outer gears 35, 25.

The inner gear 35 is in meshed engagement with the outer gear 25 along a circumference of the inner gear 35. A clearance 44 is created between the inner gear 35 and the outer gear 25 at a position along the circumference of the inner gear 35 that is opposed to the area of meshed engagement. The clearance 44 is created due to the eccentric relationship between the outer and inner gears 25, 35 and to the comparatively smaller diameter of inner gear 35.

The eccentric relationship between the inner gear 35 and the outer gear 25 allows for adjustment of the inner housing plate 20 relative to the outer housing plate 18. In operation, a rotational force is applied to rotate the inner gear 35 about the outer gear 25. Rotation of the inner gear 35 about the outer gear 25 moves of the area of meshed engagement along the circumference of the outer gear 25 and, as such, causes concurrent rotation of the inner housing plate 20 relative to the outer housing plate 18.

If the inner gear 35 includes a diameter that is smaller than the diameter of the outer gear 25 by one gear tooth 42, one complete rotation of the inner gear 35 causes the outer gear 25 to rotate a distance approximately equal to the radial height of one gear tooth 42. Therefore, controlling the revolution of the inner gear 35 controls adjustment of the inner housing plate 20 relative to the outer housing plate 18.

With particular reference to FIGS. 3-5, the actuation assembly 14 is shown to include a pivot 46, an eccentric 48, and a washer 50. The pivot 46 operably supports the actuation assembly 14 and anti-chucking assembly 16 and includes first, second, and third cylindrical sections 52, 54, 56. The first cylindrical section 52 includes a substantially constant cross-section with a key 58 formed in an end face 60. The first cylindrical section 52 is rotatably received by the central aperture 26 of the outer housing plate 18 and the central aperture 36 of the inner housing plate 20. A washer 45 retains the first cylindrical section of the pivot 46 once assembled to the outer housing plate 18.

The second cylindrical section 54 is disposed generally between the first and third cylindrical sections 52, 56 and includes a series of projections 59. The projections 59 engage a flange 61 formed on the outer housing plate 18 to define how far the first cylindrical section 52 is permitted to extend from the outer housing plate 18. In addition, the projections 59 interact with the anti-chucking assembly 16 to translate a rotational force form the pivot 46 to the inner gear 35.

The third cylindrical section 56 includes a larger diameter than both the first and second cylindrical sections 52, 54 and engages the cover 22 of the housing assembly 12 to further define the extension of the first cylindrical section 52 from the outer housing plate 18. The interaction between the projections 59 and the flange 61, as well as the interaction between the third cylindrical section 56 and the cover 22, ensures that the first cylindrical section 52 protrudes from the outer housing plate 18 only enough to be retained by the washer 45.

The eccentric 48 includes a generally C-shaped body having a substantially cylindrical outer surface 62 and an inner surface 64 defining a series of recesses 66. The outer surface 64 matingly receives the washer 50 to facilitate insertion of the eccentric 48 into aperture 36 of the inner housing plate 20 and to ensure a tight fit therebetween once assembled. The recesses 66 are disposed around the inner surface 64 of the eccentric 48 for interaction with the anti-chucking assembly 16.

In addition to the foregoing, the C-shape of the eccentric 48 defines two arms 68, each having an engagement surface 70. The arms 68 generally surround the second cylindrical section 54 of the pivot 46 once assembled while the engagement faces interact with the anti-chucking assembly 16 to prevent relative movement between the eccentric 48 and inner and outer housing plates 20, 18. The shape of the eccentric 48 reduces the overall weight of the rotary recliner 10 and therefore reduces manufacturing and component costs.

With particular reference to FIGS. 4-5, the anti-chucking assembly 16 is shown to include a wedge carrier 72 and a coil spring 74. The wedge carrier 72 includes a ring 76 having a first projection 78 and a second projection 80 extending therefrom. The first projection 78 is formed on an opposite side of the ring 76 from the second projection 80 and includes a pair of engagement surfaces 82. The first projection 78 is matingly received between the arms 68 of the eccentric 48 such that the engagement surfaces 82 oppose engagement surfaces 70.

A bridge portion 84 extends between the engagement surfaces 82 to further strengthen the first projection 78. The bridge portion 84 may include a recess 85 formed on an inner surface thereof for engagement with projections 59 of the pivot 46 such that the wedge carrier 72 is fixed for rotation with the pivot 46. In addition to interaction between the recess 85 and the projections 59, the wedge carrier 72 may also include at least one slot 89 formed on an inner surface thereof for engagement with the projections 59 of the pivot 46. Engagement between the pivot 46 and the slots 89 strengthens the connection between the pivot 46 and the wedge carrier 72 and further fixes the wedge carrier 72 for rotation with the pivot 46.

The second projection 80 includes a pair of wedges 86 each having a ramped surface 88. The ramped surfaces 88 engage the recesses 66 formed in the eccentric 48 to maintain tight engagement between the eccentric 48 and the inner housing plate 20. The tight engagement between the eccentric 48 and the inner housing plate 20 indirectly maintains tight engagement between the inner housing plate 20 and the outer housing plate 18 and therefore reduces chucking between the respective components.

The wedges 86 are connected by a bridge portion 87 that strengthens each wedge 86 and maintains a desired geometry of the wedge carrier 72. The bridge portion 87 allows the wedge carrier 72 to be formed from an inexpensive and relatively simple powder metal process. Furthermore, the bridge portion 87 allows the wedge carrier 72 to be subjected to a heat treatment process without concern of component fracture and/or geometrical instability.

Without the bridge portion 87, each wedge 86 is essentially cantilevered from the ring 76 and may be fractured during powder metal compaction and/or under the stress of a heat treatment process. Furthermore, without the bridge portion 87, the wedges 86 may lose dimensional stability when formed and/or when subjected to a heat treatment process.

The coil spring 74 includes a central coiled body 90 having a first arm 92 and a second arm 94. The coiled body 90 is received by the second cylindrical section 54 of the pivot 46 with the first arm 92 engaging the cover 22 and the second arm 94 engaging the ring 76 of the wedge carrier 72. The coil spring 74 biases the wedge carrier 72 such that the ramped surfaces 88 are biased into engagement with the recesses 66 of the eccentric 48. The coil spring 74 ensures that the ramped surfaces 88 maintain a force on the eccentric 48, inner housing plate 20, and outer housing plate 18 to reduce chucking. It should be understood that while a coil spring 74 is disclosed, that any biasing member capable of maintaining a force on the wedge carrier 72, such as a linear spring, is anticipated.

Figure 6:
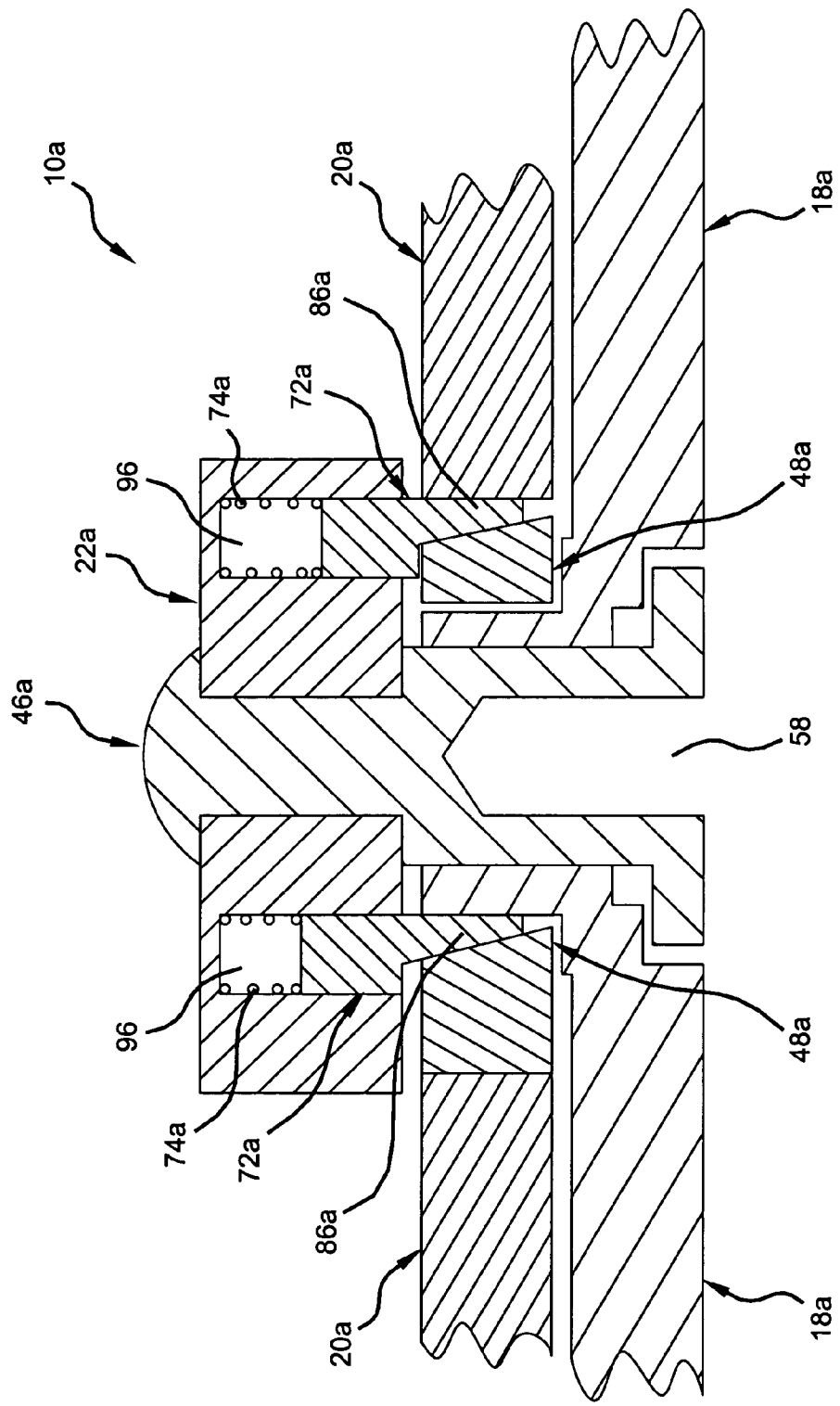
FIG. 6 is a cross-sectional view of a rotary recliner in accordance with the present teachings.

With reference to FIG. 6, another rotary recliner 10a is provided. In view of the general similarity in structure and function of the components associated with the rotary recliner 10 with respect to the rotary recliner 10a, like reference numerals are used hereinafter and in the drawings to identify like components while like reference numerals containing letter extensions are used to identify those components that have been modified.

The rotary recliner 10a includes a pivot 46a that is orbitally welded to a cover 22a. Such an arrangement obviates the need for a fastener to attach the pivot 46a to the outer housing plate 18a. It should be understood that while the pivot 46a is described as being orbitally welded to the cover 22a, that any suitable process of fixedly attaching the pivot 46a to the cover 22a, such as welding or staking, is anticipated.

The cover 22a includes a pair of recesses 96 that each receives a coil spring 74a. The coil springs 74a individually apply a force to a wedge carrier 72a having at least one wedge 86a. The force applied by the coil springs 74a maintains tight engagement between an eccentric 48a and the wedge carrier 72a and thus reduce chucking between inner and outer housing plates 20a, 18a, as described above.

Figure 7:
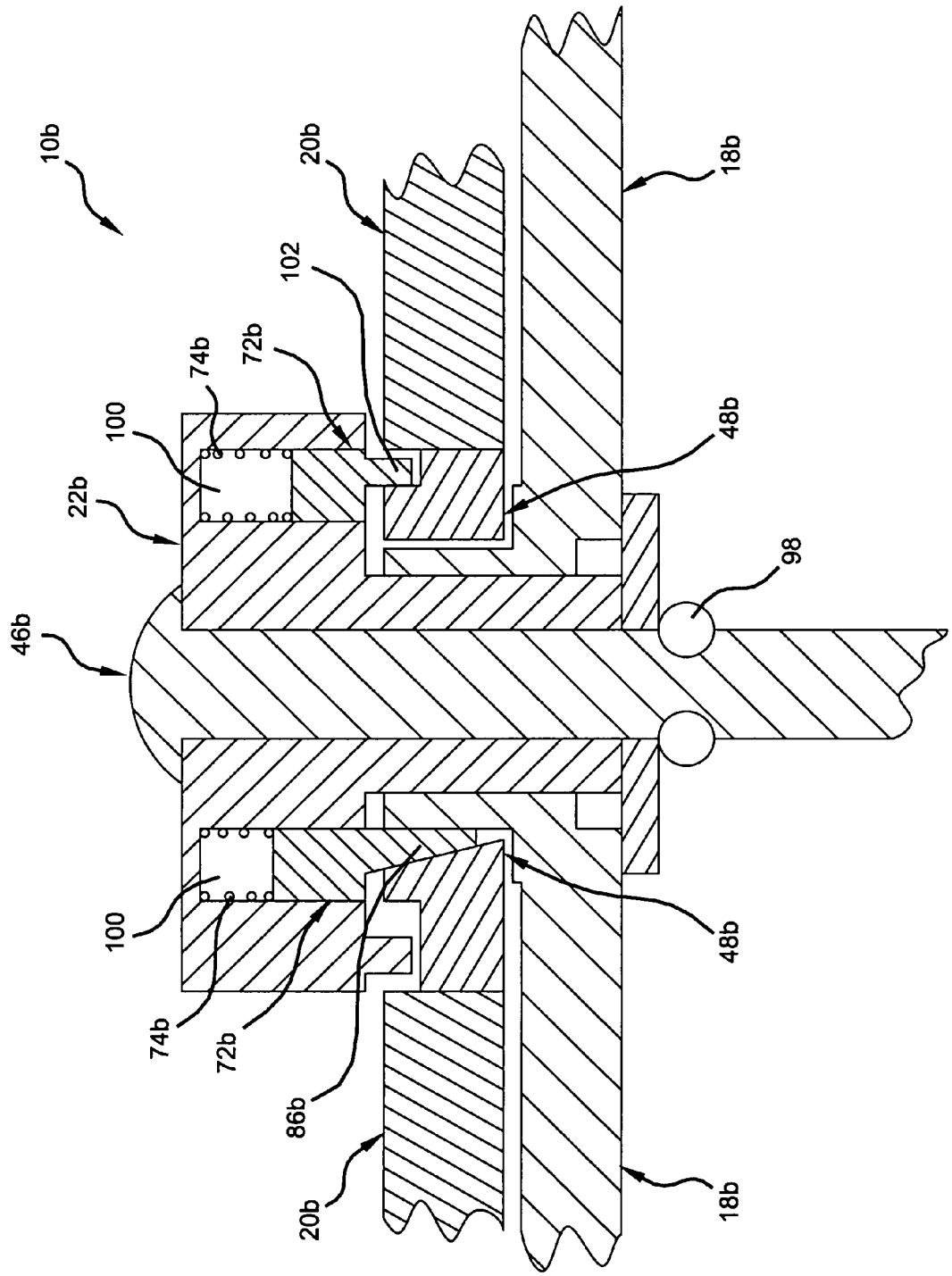
FIG. 7 is a cross-sectional view of a rotary recliner in accordance with the present teachings.

With reference to FIG. 7, another rotary recliner 10b is provided. In view of the general similarity in structure and function of the components associated with the rotary recliner 10 with respect to the rotary recliner 10b, like reference numerals are used hereinafter and in the drawings to identify like components while like reference numerals containing letter extensions are used to identify those components that have been modified.

The rotary recliner 10b includes a pivot 46b that is fixedly attached a cover 22b. The pivot 46b is shown attached to the outer housing plate 18b by a retaining ring 98. It should be understood that any suitable fastener for fixedly attaching the pivot 46b to the outer housing plate 18b, such as a nut or pin, is anticipated.

The cover 22b includes a pair of recesses 100 that each receives a coil spring 74b. The coil springs 74b individually apply a force to a wedge carrier 72b having at least one wedge 86b and a stabilizer 102. The wedges 86b cooperate with the coil springs 74a to maintain tight engagement between an eccentric 48b and the wedge carrier 72b and thus aid in reducing chucking between inner and outer housing plates 20b, 18b, as described above. The stabilizer 102 properly aligns the wedge carrier 72b with the eccentric 48b to ensure that the wedges 86b properly engage the eccentric 48b. Without proper alignment, the wedges 86b may not make full contact with the eccentric 48b.

With reference to FIG. 5, operation of the rotary recliner 10 will be described in detail. Operation of the rotary recliners 10a and 10b is generally similar to operation of rotary recliner 10. Therefore, a detailed description of rotary recliners 10a and 10b is foregone.

When the inner gear 35 is in a static state (i.e., when the inner gear 35 is not rotating relative to the outer gear 25) the coil spring 74 applies a force on the ring 76 of the wedge carrier 72 in a direction labeled "X" (FIG. 5). The applied force causes the ramped surfaces 88 of the wedges 86 to engage recesses 66 of the eccentric 48. Engagement between the wedges 86 and recesses 66 cause the eccentric 48 and washer 50 to apply a force on the inner gear 35 in a direction labeled "Y" (FIG. 5) due to the generally sloped surfaces of the wedges 86 and recesses 66.

The applied force in the Y direction maintains tight engagement between the teeth 42 of the inner gear 35 and the teeth 32 of the outer gear 25. Tight engagement between the inner gear 35 and the outer gear 25 prevents relative movement between the inner gear 35 and the outer gear 25 and, as such, prevents vibration and chucking in a static state.

To effectuate a change in position of the inner housing plate 20 relative to the outer housing plate 18, a rotational force is applied to the first cylindrical section 52 of the pivot 46 to rotate the pivot 46 relative to the outer housing plate 18. The rotational force must be sufficient to overcome the force exerted on the inner gear 35 by the eccentric 48. Specifically, the rotational force must be sufficient to overcome the force applied in the X and Y directions to allow the inner gear 35 to rotate relative to the outer gear 25.

Rotation of the inner housing plate 20 relative to the outer housing plate 18 may be accomplished without having to release the force acting on the eccentric 48. During rotation of the inner gear 35 relative to the outer gear 25, the coil spring 74 maintains contact between the wedges 86 and the recesses 66 of the eccentric 48 and thus, maintains forces in both the X and Y directions. Maintaining the forces acting on the eccentric 48 during rotation of the inner gear 35 maintains tight engagement between the inner and outer gears 35, 25 and reduces noise during actuation. The force applied to the pivot 46 must therefore be sufficient to overcome the applied force of the coil spring 74 in the X and Y directions to allow rotation of the inner gear 35 relative to the outer gear 25, as previously discussed.

Rotation of the pivot 46 concurrently rotates the wedge carrier 72 due to interaction between the projections 59 and the wedge carrier 72 (i.e., recess 85 and slots 89). Rotation of the wedge carrier 72 causes one of the engagement surfaces 82 of the wedge carrier 72 to contact one of the engagement surfaces 70 of the eccentric 48 to rotate the eccentric 48 with the pivot 46 and wedge carrier 72. The rotational direction of the pivot 46 determines which engagement surface 82 engages the eccentric 48 and which direction the inner gear 35 is rotated relative to the outer gear 25.

Once engagement surface 82 contacts engagement surface 70, the eccentric 48, washer 50, and inner gear 35 are caused to rotate about the outer gear 25. Rotation of the inner gear 35 causes concurrent rotation of the inner housing plate 20 relative to the outer housing plate 18.

Once the inner housing plate 20 is moved to a desired position relative to the outer housing plate 18, the force applied to the pivot 46 is released and the rotary recliner 10 is returned to the static state. Again, when the rotary recliner 10 is in the static state, the coil spring 74 continuously applies a force on the wedge carrier 72 to maintain the forces applied in the X and Y directions to prevent chucking between components of the rotary recliner 10.

Figure 8:
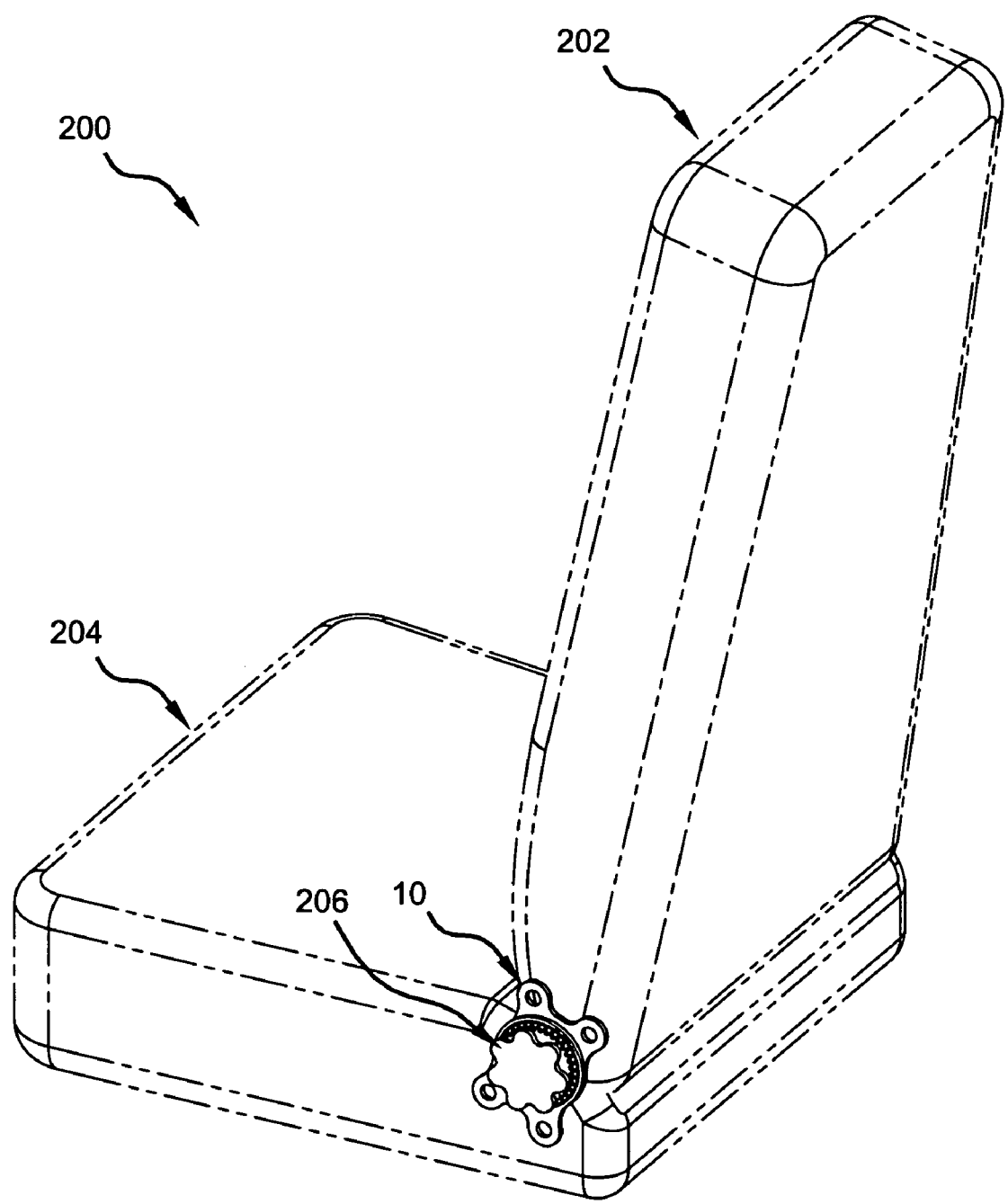
FIG. 8 is a perspective view of a seat assembly incorporating a rotary recliner and a manual actuation system in accordance with the present teachings.
Figure 9:
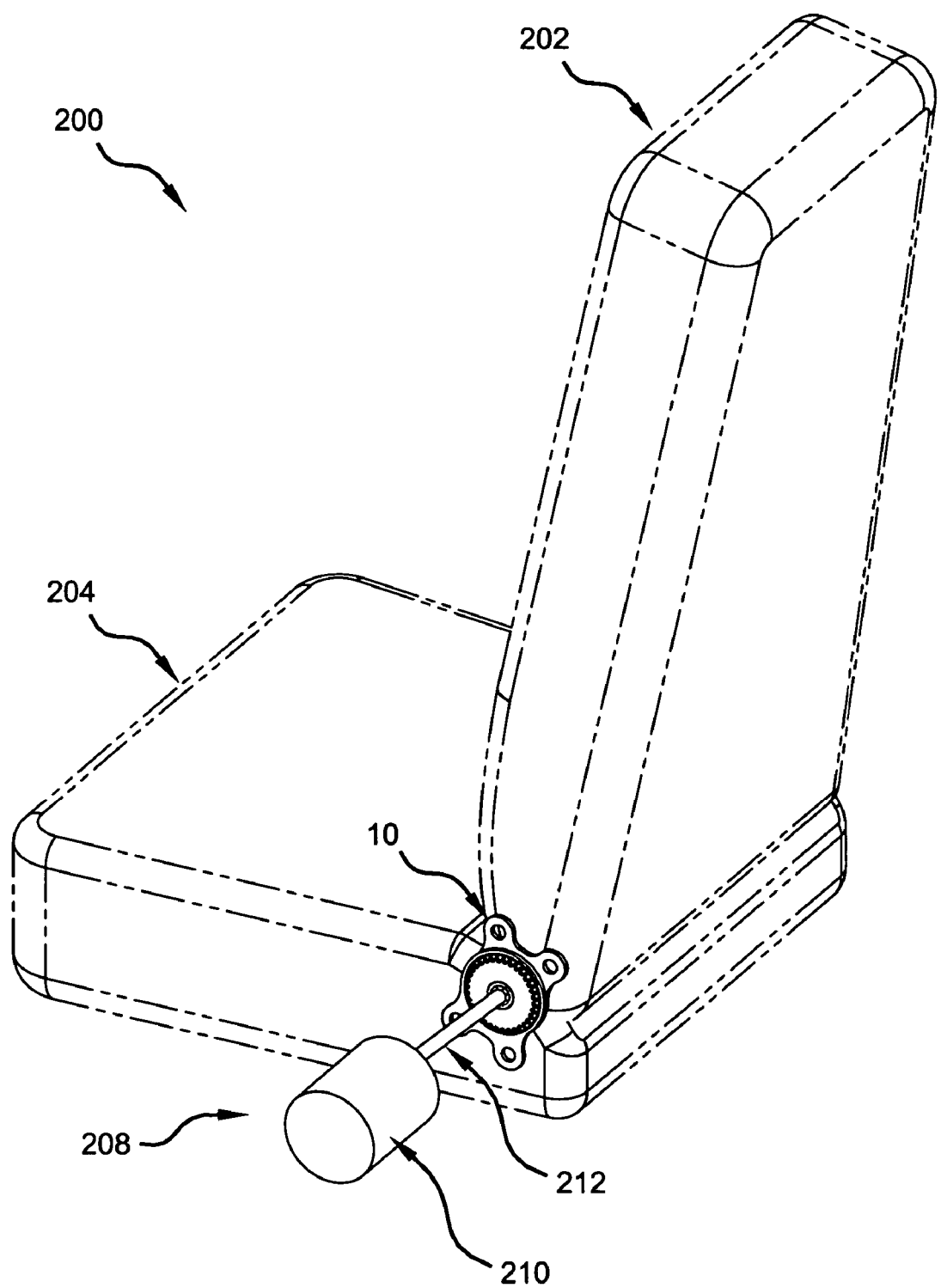
FIG. 9 is a perspective view of a seat assembly incorporating a rotary recliner and a powered actuation system in accordance with the present teachings.

With reference to FIGS. 8 and 9, the rotary recliner 10 is shown incorporated into a seat assembly 200 having a seat back 202 and a seat bottom 204. The inner housing plate 20 is fixedly attached to the seat back 202 generally at attachment apertures 40 while the outer housing plate 18 is fixedly attached to the seat bottom 204 generally at attachment apertures 30. Rotation of the inner gear 35 about the outer gear 25 causes rotation of the inner housing plate 20, as described above.

Rotation of the inner housing plate 20 causes concurrent rotation of the seat back 202 relative to the seat bottom 204 and provides a desired angle of the seat back 202. Rotation of the seat back 202 may be accomplished by either a manual operation (FIG. 8) or a powered operation (FIG. 9).

A manual system may include a handle 206 received by the key 58 of the pivot 46 such that a force applied to the handle 206 is transmitted to the pivot 46 and causes rotation of the inner gear 35. A powered system may include a power system 208 having an electric motor 210 and an armature 212. The armature 212 is driven by the electric motor 210 and is received by they key 58 of the pivot 46 such that when the armature 212 is rotated by motor 210, the inner gear 35 is concurrently rotated therewith. In either a manual or a powered system, the rotational force applied to the first cylindrical section 52 of the pivot 46 must be sufficient to overcome the force exerted on the internal components of the rotary recliner 10 by the coil spring 74 to allow rotation of the inner gear 35 relative to the outer gear 25.

The rotary recliner 10, 10a, 10b of the present teachings reduces the weight associated with the eccentric 48, 48a, 48b and allows manufacturing of the wedge carrier 72, 72a, 72b by a powder metal process. Use of a powder metal process simplifies manufacturing of the rotary recliner 10 and reduces component and assembly costs. The reduction in weight and simplification of manufacturing reduces the cost of the rotary recliner 10, 10a, 10b while still allowing for chuck-free operation.

The description of the teachings is merely exemplary in nature and, thus, variations that do not depart from the gist of the teachings are intended to be within the scope of the teachings.

What is claimed is:

1. A rotary recliner comprising:
an outer rotary member having a first series of gear teeth on an inner circumferential surface thereof;
an inner rotary member having a second series of gear teeth on an outer surface thereof;
an eccentric mounted to said inner rotary member and operable to bias said second gear teeth into meshed engagement with said first gear teeth at a first position along said inner circumferential surface such that a clearance is created between said first gear teeth and said second gear teeth at a position on said inner rotary member opposite from said first position; and
a wedge carrier having a body and a first pair of wedges extending from said body, said first pair of wedges joined by a bridge portion extending from said body the same distance as said first pair of wedges with each wedge including a ramped surface operable to engage and apply a radial force on said eccentric to prevent relative movement between said outer rotary member and said inner rotary member.

2. The rotary recliner of claim 1, wherein said eccentric includes a C-shape.

3. The rotary recliner of claim 1, wherein said eccentric includes an opening formed in a side wall of said eccentric.

4. The rotary recliner of claim 3, further comprising a second pair of wedges extending from said body of said wedge carrier.

5. The rotary recliner of claim 4, wherein said second pair of wedges are received within said opening formed in said sidewall of said eccentric.

6. The rotary recliner of claim 1, further comprising a second pair of wedges extending from said body of said wedge carrier.

7. The rotary recliner of claim 6, further comprising a second bridge portion extending between said second pair of wedges.

8. The rotary recliner of claim 6, wherein said second pair of wedges are disposed on an opposite side of said wedge carrier from said first pair of wedges.

* * * * *